(No Model.) 3 Sheets—Sheet 1.
F. P. CADY.
MACHINE FOR BARBING FENCE WIRE.
No. 256,121. Patented Apr. 11, 1882.
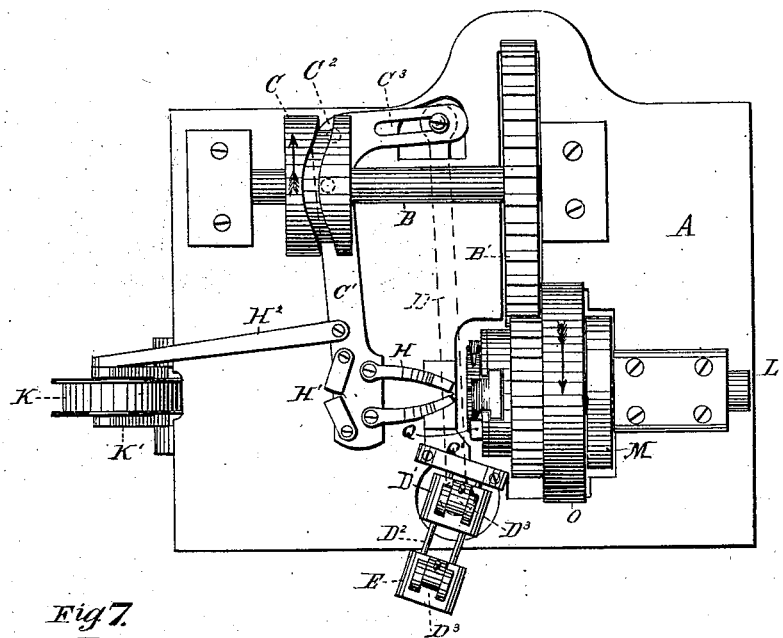
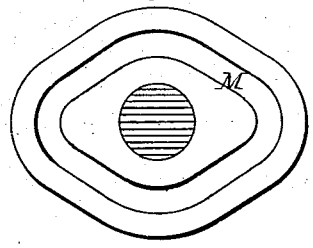
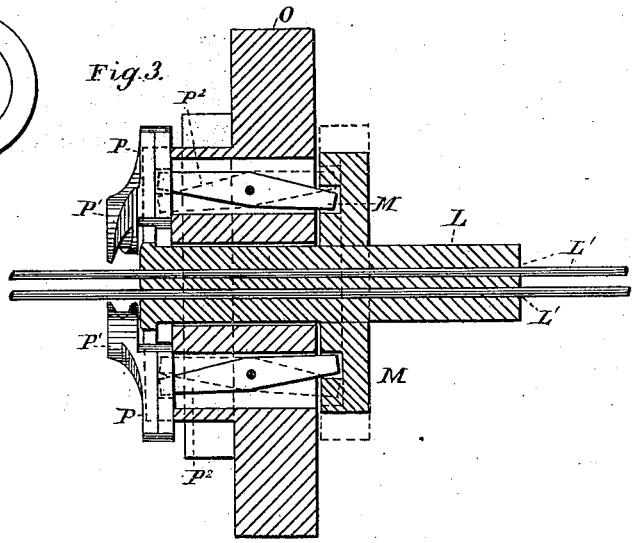
WITNESSES
INVENTOR
Frank P. Cady by
his ATTORNEY.

(No Model.) 3 Sheets—Sheet 2.
F. P. CADY.
MACHINE FOR BARBING FENCE WIRE.
No. 256,121. Patented Apr. 11, 1882.

WITNESSES

INVENTOR
Frank P. Cady
by A. Pollok
his ATTORNEY (No Model.) 3 Sheets—Sheet 3.

F. P. CADY.
MACHINE FOR BARBING FENCE WIRE.

No. 256,121. Patented Apr. 11, 1882.

WITNESSES
O. J. Lehman
H. Engel

INVENTOR
Frank P. Cady
by A. Pollok
his ATTORNEY

N. PETERS, Photo-Lithographer, Washington, D. C.

UNITED STATES PATENT OFFICE.

FRANK P. CADY, OF CLEVELAND, OHIO, ASSIGNOR TO THE WASHBURN & MOEN MANUFACTURING COMPANY, OF WORCESTER, MASSACHUSETTS, AND ISAAC L. ELLWOOD, OF DE KALB, ILLINOIS.

MACHINE FOR BARBING FENCE-WIRES.

SPECIFICATION forming part of Letters Patent No. 256,121, dated April 11, 1882.

Application filed January 9, 1882. (No model.)

*To all whom it may concern:*

Be it known that I, FRANK P. CADY, of Cleveland, in the county of Cuyahoga and State of Ohio, have invented certain new and useful Improvements in Machines for Barbing Fence-Wires; and I do hereby declare the following to be a full, clear, and exact description of the invention, such as will enable others skilled in the art to which it pertains to make and use it, reference being had to the accompanying drawings, which form part of this specification.

My invention relates to mechanism for cutting and applying barbs to barb-fence wires; and it consists in the following-described construction and association of parts, as hereinafter specified.

Figure 2:
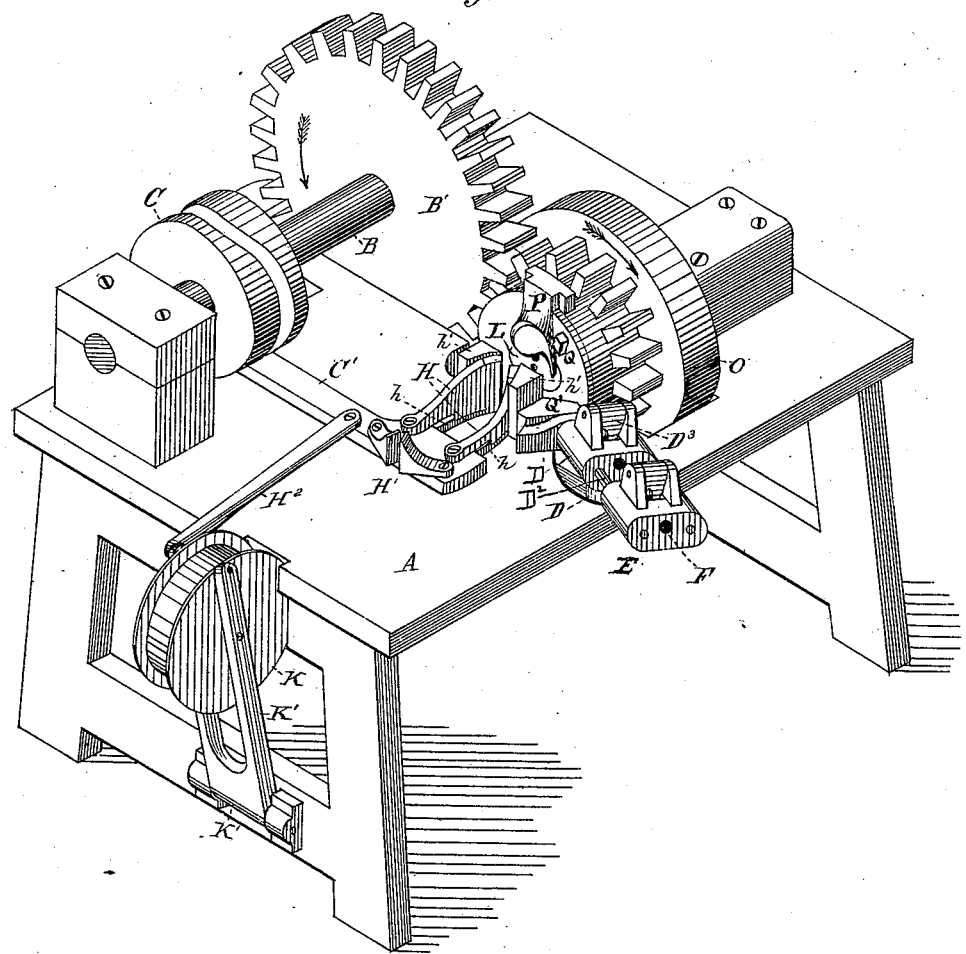
Figure 4:
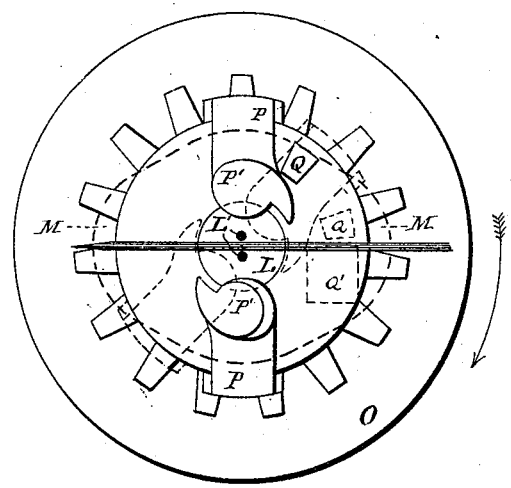
Figure 5:
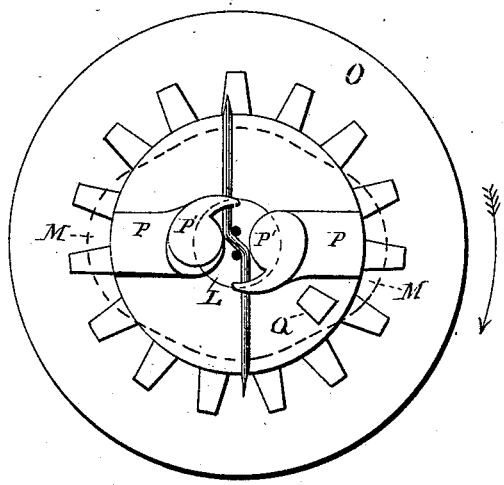
Figure 6:
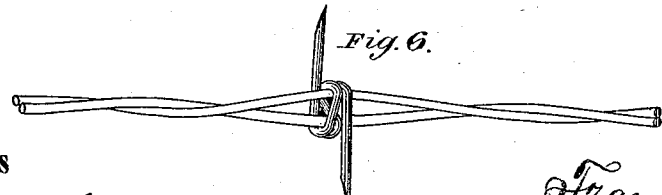

In the drawings, Figure 1 represents, in plan view, a device constructed according to my invention. Fig. 2 is an isometric view, of the same. Fig. 3 is a sectional view showing the twisting-fingers and their lever-connection with their operating-cam. Figs. 4 and 5 are face views of the twisting-head, showing its operation in applying a barb to the wires. Fig. 6 illustrates the product of the machine, consisting of two twisted strand-wires with a pointed barb twisted as shown. Fig. 7 is a face view of the cam for operating the twister through the lever-connections.

A is a suitable frame or table, upon which is carried the working parts of my device. This frame or table may be of any dimensions, fashion, or material to suit the purpose for which it is required.

B is a shaft, provided with a gear-wheel, B', to which initial power may be applied in any suitable manner from any source.

Upon the shaft B is also adjusted and fixed a cam, C. This cam is formed to impart an intermittent reciprocating motion (in due concert, as will be hereinafter specified) to the double-armed bent lever C', which is pivoted at its angle $C^2$ to the frame A. The shorter arm of the lever C' has a slot, $C^3$, to which is adjustably connected the barb-wire-feeding apparatus through the link D. If the link D is adjusted to the outer end of the slot $C^3$, then a maximum movement is imparted to the barb-wire-feeding apparatus, and the greatest length of barb will be cut and applied, whereas the barb will be cut shorter as the link D is adjusted more nearly to the pivot $C^2$. The link D passes beneath the table A to the vicinity of the barb-head, as indicated in the drawings, and is turned upward through the table and is armed with a traveling barb-wire feeder, D'. This feeder consists essentially of a block or body sliding upon one, two, or more guide-bars, $D^2$, and upon this block or body is pivoted or suitably attached a gripe, $D^3$, which will permit the wire to pass freely through it in its feeding direction, but which will prevent its moving in an opposite direction. For this purpose any suitable clutch or griping device that will perform as just specified may be employed.

At the rear of the traveling feeder D', and rigidly attached or connected to the guides $D^2$, is situated a stationary feeder, E, provided with a clutch or gripe, $D^3$, of the same character and performing the same function as the clutch just described in connection with the traveling barb-wire feeder D'. The operation of this feeding device is as follows: The barb-wire is passed through the openings F beneath the clutches $D^3$. The forward movement of the traveling feeder D' carries with it the barb-wire, and, as already specified, the degree or extent of this feed is determined by the adjustment between the link D' and slot $C^3$ of the lever C'. As the traveling feeder D' moves back, preparatory to feeding forward the next succeeding length of barb-wire, the stationary clutch E prevents the barb-wire from escaping backward. Thus at each forward movement of the traveling feeder D' a length of wire suitable for a barb is drawn through the stationary feeder E and fed to the machine.

The guides $D^2$, upon which are placed the feeding mechanism, are suitably anchored to the table A. It will be observed that the guides $D^2$ present at an angle to the face or plane of rotation of the barb-twisting apparatus. This is for the purpose of presenting the barb-wire at a corresponding angle to the cutting-lines, so that when a barb is severed it shall be cut slanting, and thus pointed, which would not be the case were it to be squarely sheared or cut off. I do not lay any broad claim to this feature of the invention, as I am aware that it is common to present the barb-wire thus to the cutting mechanism for the purpose mentioned.

Attached to the longer arm of the lever C' are the following parts—viz., the clamps H, for holding the two strand-wires in proper position while the barb-wire is being twisted around them; the clutch H', for assisting in drawing forward the barbed strand after a barb has been applied; and a link, H², connecting with and imparting an intermittent reciprocating motion to the slack-wheel K, which said slack-wheel is carried upon a frame, K', pivotally attached to the frame A. As the lever C' imparts its intermittent reciprocating motion to the clamps H said clamps are made to close together as they approach the barb-bending apparatus, and to open as they recede therefrom, by their engagement with cam-slots $h$ formed within or upon the table A.

$h'$ are two stationary abutments rigidly attached to the table A for supporting the clamps in their closed position, while retaining the strand-wires in their proper relation during the time that a barb is being bent around them.

I will now describe the mechanism for cutting the barbs and bending them upon the strand-wires.

The two wires composing the strand-wire of the fence are introduced into the stationary bar or rod L. This rod passes through the central portion of the barb-bending apparatus, as indicated in the drawings. Two holes or channels, L', afford passage for the component wires of the fence-strand. These holes terminate one above the other, and the barb-wire-feeding apparatus is so adjusted that the barb-wire is fed in between the strand-wires as they emerge from the holes L'.

M is a stationary cam fixed upon the stationary bar or rod L, and this cam is designed to impart a longitudinal movement to the bending-fingers P', as and for the purpose hereinafter shown.

The barb-bending head O revolves around the hollow bar L and is driven by a gear or any other suitable connection with the main shaft B. This revolving head carries two opposing longitudinal sliding bars, P, formed substantially in the manner indicated in the drawings, and each provided with fingers, P'. Each of these bars is connected with one end of a lever, P², pivoted within the revolving head O, as shown. The other ends of the levers P² engage with the slot in the stationary cam M. This cam is so constructed and adjusted that when the finger-bars P are pointing up and down they shall be moved their farthest distance apart, and when presenting horizontally they shall be moved the nearest together. The manner in which these finger-bars are moved will be clearly apparent when the connection between said finger-bars, their levers P², and the stationary cam is considered. The shaft B and gear-wheel B' during the operation of the machine are kept constantly revolving, therefore a constant revolution of the barb-bending apparatus O P P' P² results. The idea, however, of a constantly-revolving barb-bending apparatus is not my invention, broadly considered; but that which constitutes my invention as respects this feature of the machine is the stationary cam M, the finger-bars P, and the lever-connection P², as shown and described.

The operation of my device is as follows; and in connection with my description of said operation, all that is necessary to specify respecting the cams C and M is that they shall be constructed and adjusted to actuate the parts with which they are connected in the concert and order hereinafter described. The barb-wire is fed in between the strand-wires, while the finger-bars P point up and down. As soon as a length of barb-wire has been fed the barb-bending head O, revolving in the direction indicated by the arrow, causes the bending-fingers P' to impinge on opposite sides of the barb, while at the same time this barb is severed by the revolution of the shear-plate Q past the stationary plate Q'. Meanwhile the clamps H have approached toward the bending-head O and firmly clamped the strand-wires, so as to hold them one above the other firmly, while the revolutions of the bending-fingers P', as they are carried around by the head O, twist the barb-wire and apply it to the strand-wires, as illustrated in Fig. 6 of the drawings. At each time when the finger-bars P present horizontally they are brought forcibly together, like hammers, against the bent barb, and thus force it firmly into contact with the strand-wires around which it is bent. Two of these hammering movements are imparted to the finger-bars P during the application of every barb, and this hammering movement is imparted through the lever-connection P² between the finger-bars P and stationary cam M, as just described. When the barb has been bent upon its strand-wires its ends have been so shortened as to escape the bending-fingers P'. As soon as a barb has been completely applied to its strand-wire the clamps H open and recede. The clutch H' draws the strand-wire through the hollow bar L a distance equal to the space between the barbs upon the strand, after which these clamps H advance again and grasp the strand-wires to hold them in position for the application of the next succeeding barb.

The function of the wheel K is to take up the slack of the strand-wire between the barbing-head O and the strand-twister, (not shown,) its motion being both synchronous and isochronal with the motion of the lever C' and its attached parts. The slack of the strand-wire will always be compensated and taken up in such a manner as to avoid deranging the operation either of the strand-twisting mechanism or barbing apparatus. The barbed strand passes over the wheel K, then around and underneath it, and underneath the table A to any suitable reeling and twisting machine.

Instead of using a rigid connection between the lever C' and the slack-wheel K, an elastic or yielding connection (through a spiral or other suitable form of spring, for example) may be employed, whereby the movement imparted to the slack-wheel will automatically adjust itself to take up the slack, notwithstanding limited variation in the amount of slack.

What I claim is—

1. The combination, with the barb-wire-feeding apparatus and the strand-wire-feeding apparatus, of an operating-lever common to and connected with both said apparatus, substantially as described.

2. In a machine for barbing fence-wires, the strand-wire clamps H and means for imparting thereto an intermittent reciprocating motion, in combination with slots or guides h, that shall close said clamps as they move forward and open them as they recede, substantially as and for the purposes shown.

3. In a wire-barbing machine, the combination, with the strand-wire clamps H, of the abutments or braces h', substantially as and for the purposes shown.

4. In a wire-barbing machine, the combination, with a barb-wire-feeding device, a strand-wire clamp, and a strand-wire-feeding apparatus, of a lever and means for connecting it with the aforesaid barb-wire-feeding device, strand-wire clamp, and strand-wire-feeding apparatus, substantially as and for the purposes shown.

5. The combination, with the barb-wire-feeding apparatus and an operating-lever, of devices for connecting the said apparatus with said lever, and for adjusting the point of connection nearer to or farther from the fulcrum of said lever to alter the feed of said apparatus, substantially as described.

6. The combination of the barbing-head and bending-fingers carried by the said head, with levers pivoted to said head, so as to vibrate in planes parallel with the axis thereof, and a cam for operating said levers, substantially as described.

7. The combination of the barbing-head, the bending-fingers carried thereby, the stationary cam at the rear of said head, the levers pivoted inside the head and engaging at their front ends with said bending-fingers and at the rear end with said cam, substantially as described.

In testimony whereof I have signed my name to this specification in the presence of two subscribing witnesses.

FRANK P. CADY.

Witnesses:
JNO. CROWELL, Jr.,
ALBERT E. LYNCH.